United States Patent [19]

Hoshino et al.

[11] Patent Number: 5,757,420
[45] Date of Patent: May 26, 1998

[54] PHOTOGRAPHIC IMAGE PROCESSING APPARATUS

[75] Inventors: Yasushi Hoshino; Kohichi Yamaguchi; Satoshi Harada; Toshiki Fujisawa; Kosei Miyauchi, all of Hachioji, Japan

[73] Assignee: Konica Corporation, Tokyo, Japan

[21] Appl. No.: 839,631

[22] Filed: Apr. 15, 1997

[30] Foreign Application Priority Data

Apr. 25, 1996 [JP] Japan ................. 8-105276

[51] Int. Cl.$^6$ ................. G03B 1/42; H04N 7/18
[52] U.S. Cl. ................. 348/96; 353/120
[58] Field of Search ................. 348/96; 358/506; 360/85, 94; 353/120; H04N 7/18; G03B 1/42

[56] References Cited

U.S. PATENT DOCUMENTS

| | | | |
|---|---|---|---|
| 3,836,241 | 9/1974 | Staar | 353/120 |
| 4,858,003 | 8/1989 | Wirt | 353/120 |
| 5,486,959 | 1/1996 | Tai | 360/94 |
| 5,546,122 | 8/1996 | Asami | 348/96 |
| 5,633,733 | 5/1997 | Miyazawa | 348/96 |
| 5,657,074 | 8/1997 | Ishibe | 348/96 |

*Primary Examiner*—Howard W. Britton
*Attorney, Agent, or Firm*—Finnegan, Henderson, Farabow, Garrett & Dunner, L.L.P.

[57] ABSTRACT

A film scanner includes: a film carrier having, an aperture for image reading, a film conveyor for conveying a film on which image information in each frame has been recorded, to the aperture one frame by one frame of the film, and a communication device for receiving a control signal to control the film conveyor; an image reader for optically reading the recorded image information on the film; a controller for generating the control signal; and a first outputting device connected with the communication device for outputting the control signal to the film carrier.

18 Claims, 12 Drawing Sheets

CONTROL INSTRUCTION CODE
- AA : CONDUCT AUTO-LOADING
- BB : CONDUCT WINDING BY ONE EXPOSURE
- CC : CONDUCT RETREATING BY ONE EXPOSURE
- DD : CONDUCT TAKING UP
- EE : REQUEST VERSION NUMBER

FIG. 10 (b)

RETURN INSTRUCTION
- aa : FINISHED NORMALLY
- bb : FINISHED ABNORMALLY (TIME IS OVER)
- cc : FINISHED ABNORMALLY (ABNORMAL OPERATION)

PHOTOGRAPHIC IMAGE PROCESSING APPARATUS

BACKGROUND OF THE INVENTION

The present invention relates to a photographic image processing apparatus which reads image information recorded on a film and displays aforesaid image.

Recently, a photographic image processing system in which an image photographed by means of a camera is converted to electronic digital image data has come to be used. In such a system, it is common that an object is photographed by means of a camera, developed film is read by means of a scanner and converted to digital image data for storing.

On the other hand, the form of developed film are various. For example, the most common form is J135 negative film, in which a film is returned from a photo-finishing laboratory in such a manner that the film is cut every 6 frames (hereinafter, referred to as a piece film). In the case of a J135 reversal film, each frame is mounted (hereinafter, referred to as a mount film). In addition, in the Advanced Photo System recently announced, the developed film is returned from the lab in which the entire roll of film is wound in a cartridge (hereinafter, referred to as IX-240 long roll film). As described above, the type of films has been diversified. Accordingly, in the photographic image processing apparatus which is one of the above-mentioned photographic image processing system, an apparatus which complies with customers' requests such as easy use and easy viewing in addition to cope with diversified photographic film.

SUMMARY OF THE INVENTION

An objective of the present invention is to provide a photographic image processing apparatus capable of image-processing effectively when image information is read and to be displayed on a displaying means, if the type of film is an IX-240 long roll film. (1) The present invention is characterized by a film scanner including: a film carrier having, an aperture for image reading, a film conveyor for conveying a film on which image information has been recorded to form separated image frames to the aperture one frame by one frame of the film, and a communication device for receiving a control signal to control the film conveyor; an image reader for optically reading the recorded image information on the film; a controller for generating the control signal; and a first outputting device connected with the communication device for outputting the control signal to the film carrier.

Owing to the constitution of the present invention, by providing the film carrier with a communication function and a film winding function, loading property of the cartridge can be improved and image information processed by a processing means can effectively be displayed on a displaying means. (2) In the above-mentioned occasion, the above-mentioned film carrier comprises an aperture for reading an image and outputted data from the reading means is used for adjusting white balance when irradiating beam from a light-source of the above-mentioned reading means passes the aperture for the above-mentioned image reading under the condition that the aperture is not covered by the film.

Owing to the constitution of the present invention, white balance can be taken prior to pre-scanning utilizing a aperture formed on a film carrier for reading an image. Accordingly, the structure of the film carrier can be downsized and simplified. (3) In addition, when the film scanner is connected with a personal computer having a displaying means, the film scanner is characterized by reading a frame of a film retained by the film carrier by means of continuous pre-scanning and displaying index image of frame image information read on the above-mentioned displaying means.

Owing to the constitution of the present invention, by pre-scanning the film continuously, frame image information read can be index-displaying on the displaying means. (4) In addition, when the film scanner is connected with a personal computer which is provided with a displaying means, an operating means, and an entire control means that displays photographic image information and controls the entire operation, the film scanner forms a system as a photographic image processing apparatus as a whole. The above-mentioned entire control means sends a prescribed control instruction to the above-mentioned scanner and communicate information directly with the above-mentioned film scanner and thereby communicates information between the control means and the film carrier.

Owing to the constitution of the present invention, information can be communicated between the control means and the film carrier and the scanner is not necessary to be modified even when specifications are modified. (5) In addition, the photographic image processing apparatus has an ejection function to drive the film carrier so that a part of the carrier is protruded outside the film scanner and to stop the film carrier at a position where the cartridge can be replaced.

Owing to the constitution of the invention, it is so convenient that the cartridge can be replaced while the film carrier is loaded to the scanner.

DETAILED DESCRIPTION OF THE PREFERRED EMBODIMENT

Hereinafter, referring to drawings, an embodiment of the Example of the present invention will be detailed.

Figure 1:
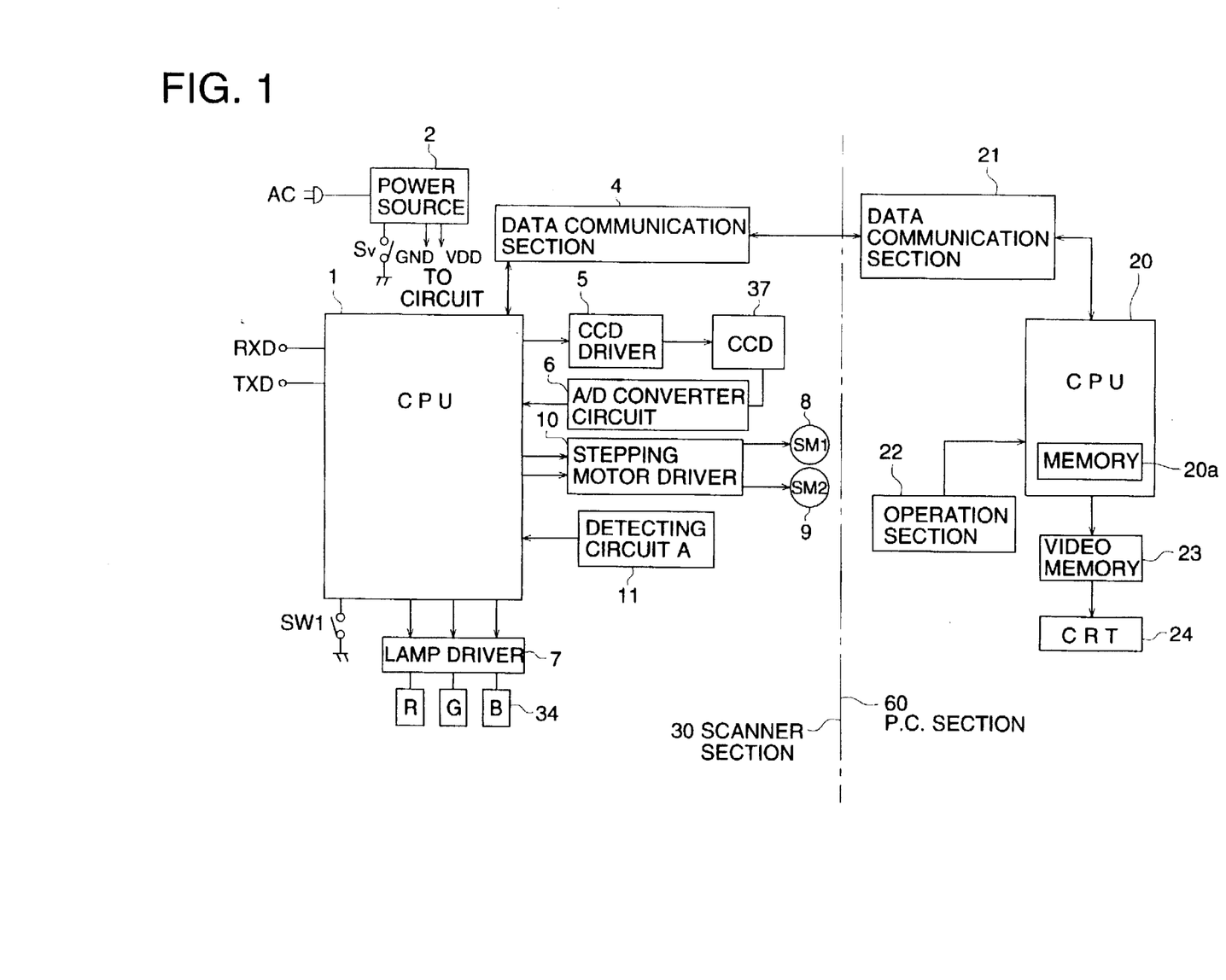
FIG. 1 is a block diagram showing an electrical constitution example of the present invention.
Figures 2A, 2B:
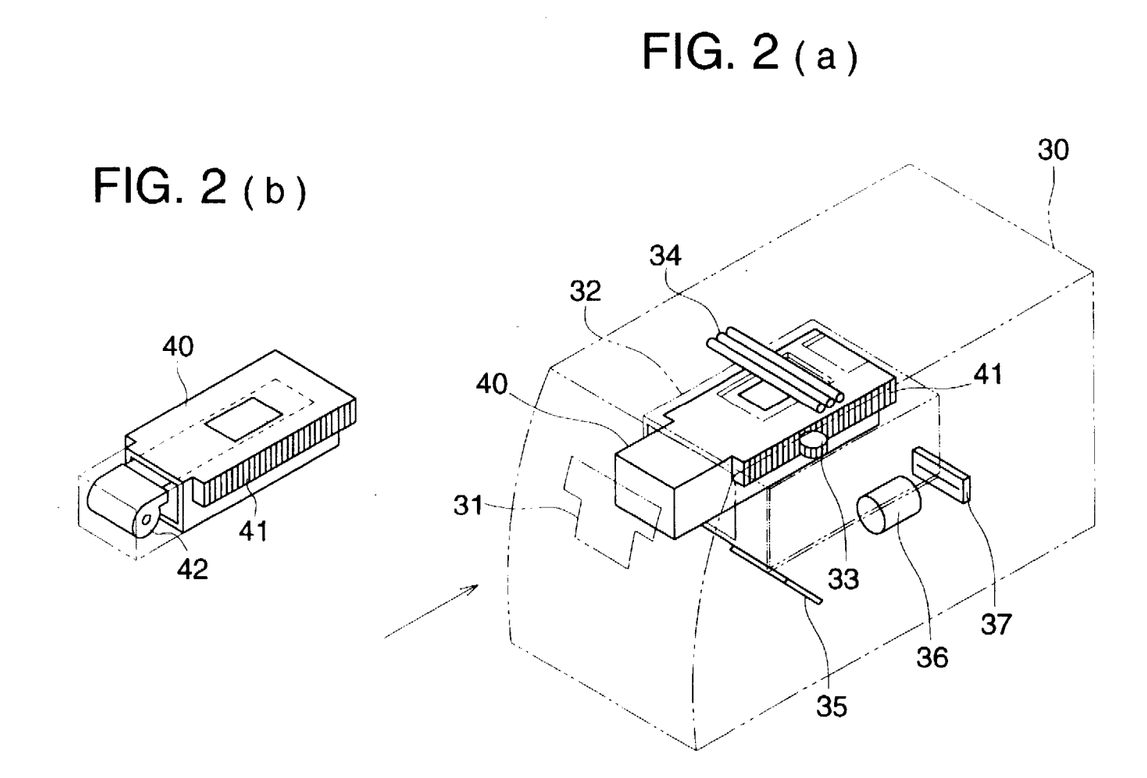
FIGS. 2(a) and 2(b) are drawings showing a mechanical constitution example of the present invention.

FIG. 1 is a block diagram showing an example of an electrical block diagram of the present invention. FIGS. 2(a) and 2(b) are drawings showing mechanical structure of the example of the present invention. In the embodiment, the photographic image processing apparatus comprises scanner section 30 which reads image information recorded on a film, personal computer section 60 which controls entire operation together with displaying image information and carrier 40 loaded onto scanner section 30.

In FIGS. 2(a) and 2(b), numeral 40 represents a film carrier (hereinafter, simply referred to as "carrier") which houses a IX-240 long roll film (a film for an Advanced Photo System) and is inserted in a scanner. In the drawings, an external appearance drawing of the carrier and the status in which the carrier is inserted into the scanner are shown. Aforesaid carrier 40 is formed into a cartridge, as shown in FIG. 2(a), and comprises a data communication function and a film winding and rewinding function. Numeral 30 represents a scanner, numeral 31 represents a carrier insertion port provided in scanner 30. Numeral 32 is a stage which loads carrier 40 provided inside scanner 30 and moves.

Numeral 41 represents a rack formed on the side of carrier 40. Numeral 33 represents a pre-scanning driving gear (pinion) provided inside scanner 30. The above-mentioned rack and the pinion constitute a rack and pinion gear. Numeral 34 represents a lamp illuminating each frame of film mounted on scanner 30. Numeral 35 represents a mirror reflecting image information which is transmitted to a film by aforesaid lamp 34. Numeral 36 represents a lens converging reflected light beams from aforesaid mirror 35. Numeral 37 represents a CCD which receives optical signal converged by aforesaid lens 36 and which converts it to electrical signal. The above-mentioned lamp 34 is provided for each of R, G and B. The CCD 37 is a line CCD for monochromatic color which receives color information corresponding to each of R, G and B. Every time the film is fed by one frame by a stepping motor, color information is read by an R irradiation, followed by reading of color information by a G irradiation. Then, color information is read by a B irradiation, after which aforesaid process is repeated.

Onto carrier 40, cartridge 42 housing a developed film is loaded so that, by means of a driving mechanism, the film can be fed one frame by one frame. An apparatus shown in FIG. 1 is composed of scanner section 30 and personal computer 60 which serves as a control means. In the scanner section, numeral 1 represents a CPU which controls entire operation. RXD and TXD represent a communication terminal for data communication which is connected with carrier 40, and they are connected to CPU 1. Numeral 2 represents an electrical power supply circuit which supplies electrical power from the AC power source to each circuit of scanner section 30 and carrier 40, in which a switch SV for actuating aforesaid electrical power supply circuit 2 is provided. SW1 represents a reset switch for resetting CPU 1.

Numeral 4 represents a data communication section which communicates data with personal computer 60, and a SCSI interface is used. Numeral 37 represents a CCD which reads image information from a film and to converts it to electric signals. Numeral 5 represents a CCD driver which drives aforesaid CCD 37. As CCD 37, a line CCD as shown in FIG. 2(a) is used. Numeral 6 represents an A/D converter circuit which converts an image signal read by CCD 37 into digital image data.

Numeral 34 represents a lamp which irradiates a film. Numeral 7 represents a lamp driver which drives aforesaid lamp 34. Numeral 8 represents a first stepping motor (SM1) which drives the above-mentioned rack and pinion mechanism. Numeral 9 represents a second stepping motor which drives stage 32. Numeral 10 represents a stepping motor driver which controls stepping motors 8 and 9.

Numeral 11 represents a first detecting circuit A which senses the position of a carrier. Aforesaid detecting circuit 11 is used for setting initial position when carrier 40 is inserted into scanner 30. For example, a photo-sensor is used.

In personal computer 60, numeral 20 represents a CPU which controls entire operation, and numeral 20a represents a memory which stores read image data provided in aforesaid CPU 20. In aforesaid memory 20a, displaying frame number of a film read by a pre-scanner displayed on a displaying means and resolution data per one frame is stored in advanced. Numeral 21 represents a data communication section for communicating data with scanner section 30. Numeral 22 represents an operation section which commands various kinds of operation on CPU 20. For example, a keyboard and a mouse are used. Numeral 23 represents a video memory which stores an image read from a film. Numeral 24 represents a CRT used as a display means which displays image data stored in aforesaid video memory. Operation of the apparatus constituted as above will now be explained.

First, the constitution and operation of carrier 40 will be explained.

Figure 3:
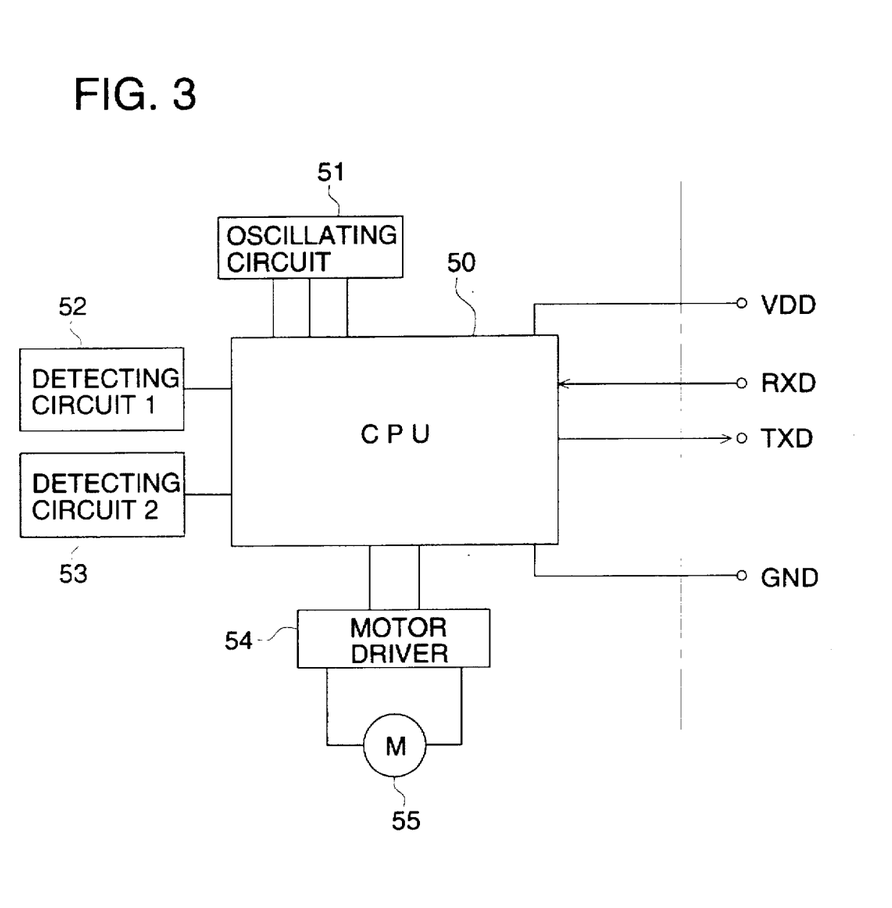
FIG. 3 is a block diagram showing an electrical constitution example of the carrier.

FIG. 3 is a block diagram showing electrical constitution example of carrier 40. Due to a structure that aforesaid unit is inserted into scanner 30, carrier 40 is connected with scanner 30 through a contact point so that power is supplied from scanner 30. In FIG. 3, VDD and GND are examples of aforesaid terminals. In FIG. 3, numeral 50 represents CPU which controls entire operation. Numeral 51 represents an oscillating circuit which provides operation clock to aforesaid CPU 50. Numeral 52 represents a first detecting circuit which senses film perforations when each frame is fed. Numeral 53 represents a second detecting circuit which detects finish position of a film. Numeral 54 represents a motor driver which receives a control signal from CPU 50. Numeral 55 represents a DC motor which is driven by aforesaid motor driver 54 for winding and rewinding the roll film. RXD and TXD are communication terminals which are connected with CPU 1 (see FIG. 1) inside scanner 30 for communicating information. Operation of an apparatus constituted as above is explained as follows.

Figure 5A:
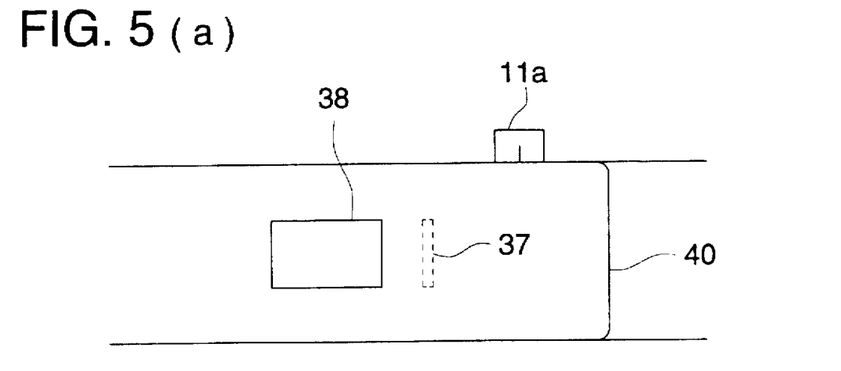
FIGS. 5(a)–5(f) are explanation drawings showing operation of white balance adjustment.
Figure 5B:
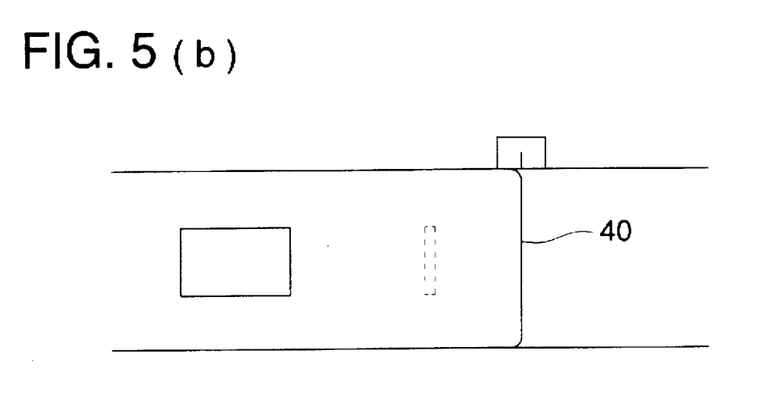

Namely, first, when carrier 40 in which cartridge 42 is housed is loaded to scanner 30, the carrier becomes a status as in FIG. 5(b) due to the initial position setting operation so that power is supplied to carrier 40. Due to this, CPU 50 sends motor driver 54 a control signal for activating DC motor 55. As a result, a film is thrust out from cartridge 42. The film extends towards the opposite end. The winding spool is rotated by means of DC motor 55 for winding the film. When the first detecting circuit 52 detects that the first frame reaches a prescribed position, CPU 50 completes initial setting operation. When entering pre-scanning operation, CPU 50 receives information such as set frame number from CPU 1 on the scanner side. First detecting circuit 52 detects perforations of a film. CPU 50 uses output by aforesaid detecting circuit 52 for controlling frame feeding operation from a frame position to the next frame position.

Figure 4:
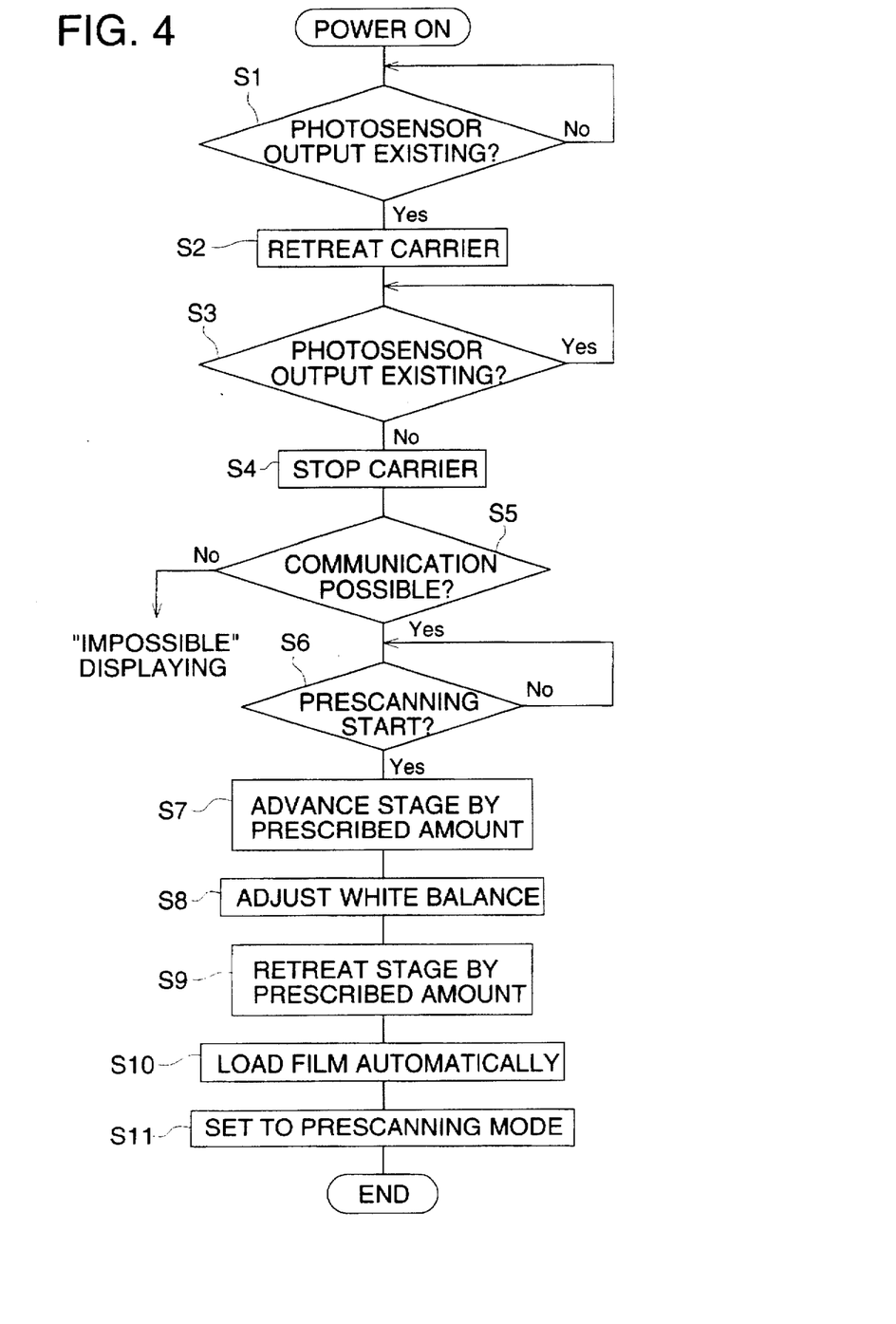
FIG. 4 is a flow chart showing an operation of white balance adjustment.
Figure 5C:
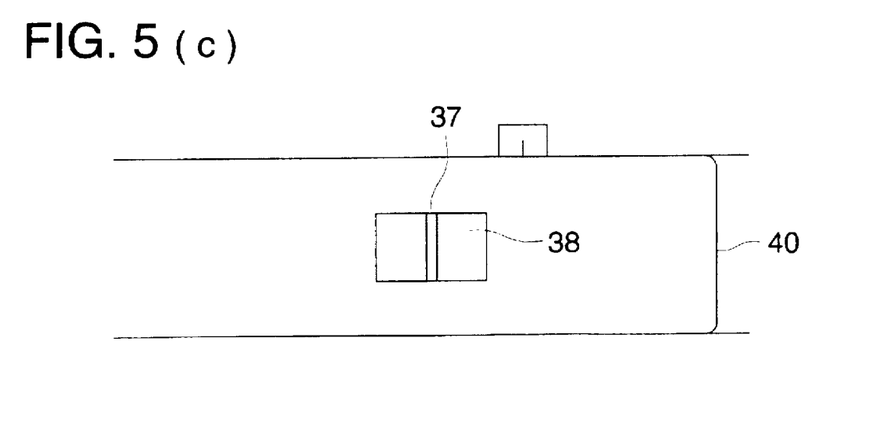

(1) White balance adjustment FIG. 4 represents a flow chart showing operation for a white balance adjustment. FIGS. 5(a)–5(f) are explanation drawings for the operation of white balance adjustment. In FIGS. 5(a)–5(c), numeral 11a represents a photosensor as a detecting sensor. Numeral 37 represents a CCD, and numeral 38 represents an aperture for reading an image. The operator inserts a carrier from carrier insertion port 31. Photosensor which is a detecting sensor, serves as a part of detecting circuit 11 detects whether or not the carrier has been inserted (S1). When photosensor 11a detects insertion of the carrier, stepping motor 8 is activated so that carrier 40 return to the initial position by means of a rack and pinion mechanism (S2). Whether or not there is output for detection by photosensor 11a is checked (S3). When photosensor stops outputting, it means that the carrier reaches the reference position. Therefore, CPU 1 stops carrier 40 (S4). FIG. 5(b) shows the status in which carrier 40 stops. In this status, the communication terminal of the cartridge is connected to scanner section 30.

Next, while carrier 40 stops operation, CPU 1 conducts communication confirmation (S5). This communication confirmation checks whether or not communication between carrier 40 and scanner 30 is possible utilizing communication terminals RXD and TXD (both the carrier and the scanner provide them). When communication is impossible, Message "impossible" is displayed. When communication is possible, the operator presses a pre-scanning start button on operation section 22 on personal computer 60 for starting pre-scanning (S6).

When the pre-scanning start button is pressed, this information is sent to CPU 1 from data communication section 21 through data communication section 4 on scanner section 4. CPU 1 drives stepping motor 9 for stage driving and advances stage 32 by a prescribed amount (S7). FIG. 5(c) shows a status in which carrier 40 advances by a prescribed amount and aperture 38 for image reading comes right above CCD 37. In this status, lamp 34 is lit, CCD 37 is irradiated and output from CCD 37 is read. Under this status, the adjustment of white balance of CCD 37 (lamp output adjustment and shading correction) are conducted (S8). Practically, optical information data read by CCD 37 is communicated to CPU 20 on personal computer 60 from data communication section 4 after aforesaid data is converted to digital image data in A/D conversion circuit 6. CPU 20 receives data outputted from CCD 37 and operates white balance adjustment. As described above, according to the present invention, utilizing aperture 38 for image reading, white balance can be adjusted prior to prescanning and the structure of the film carrier can be downsized and simplified.

Figure 5D:
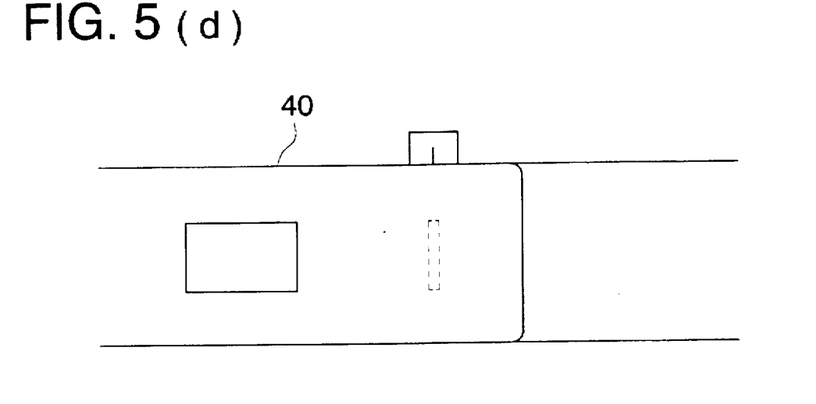
Figure 5E:
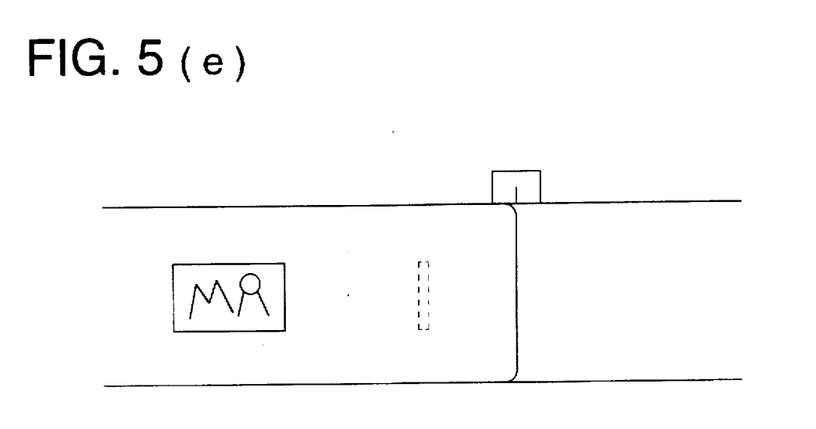
Figure 5F:
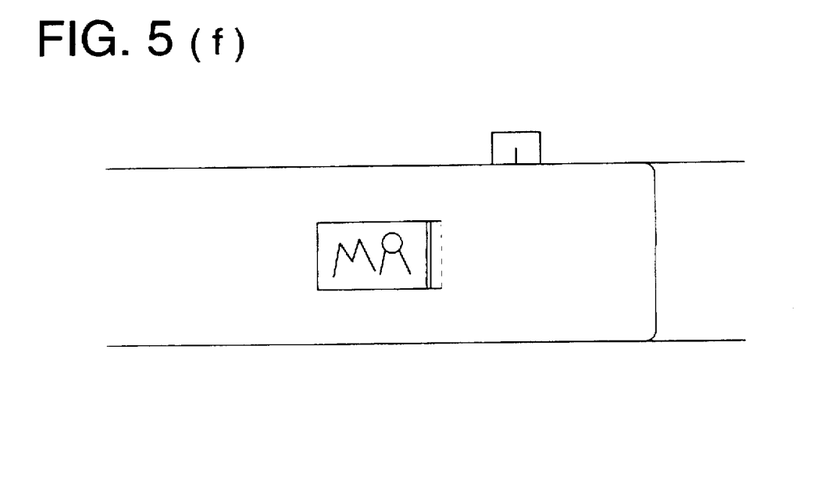

When the white balance adjustment is finished, CPU 1 activates stepping motor 9 to retreat stage 32 by a prescribed amount to bring to the reference position (S9). FIG. 5(d) shows the status of the reference position. Next, CPU 50 inside carrier 40 activates DC motor 55 for automatic loading (winding) the film (S10). FIG. 5(e) shows a status in which a film is wound. FIG. 5(f) shows a status in which the first frame of film image meets aperture 38 for image reading so that an image can be read. In this status, CPU 1 conducts pre-scanning (S11).

(2) Pre-scanning

Figure 6:
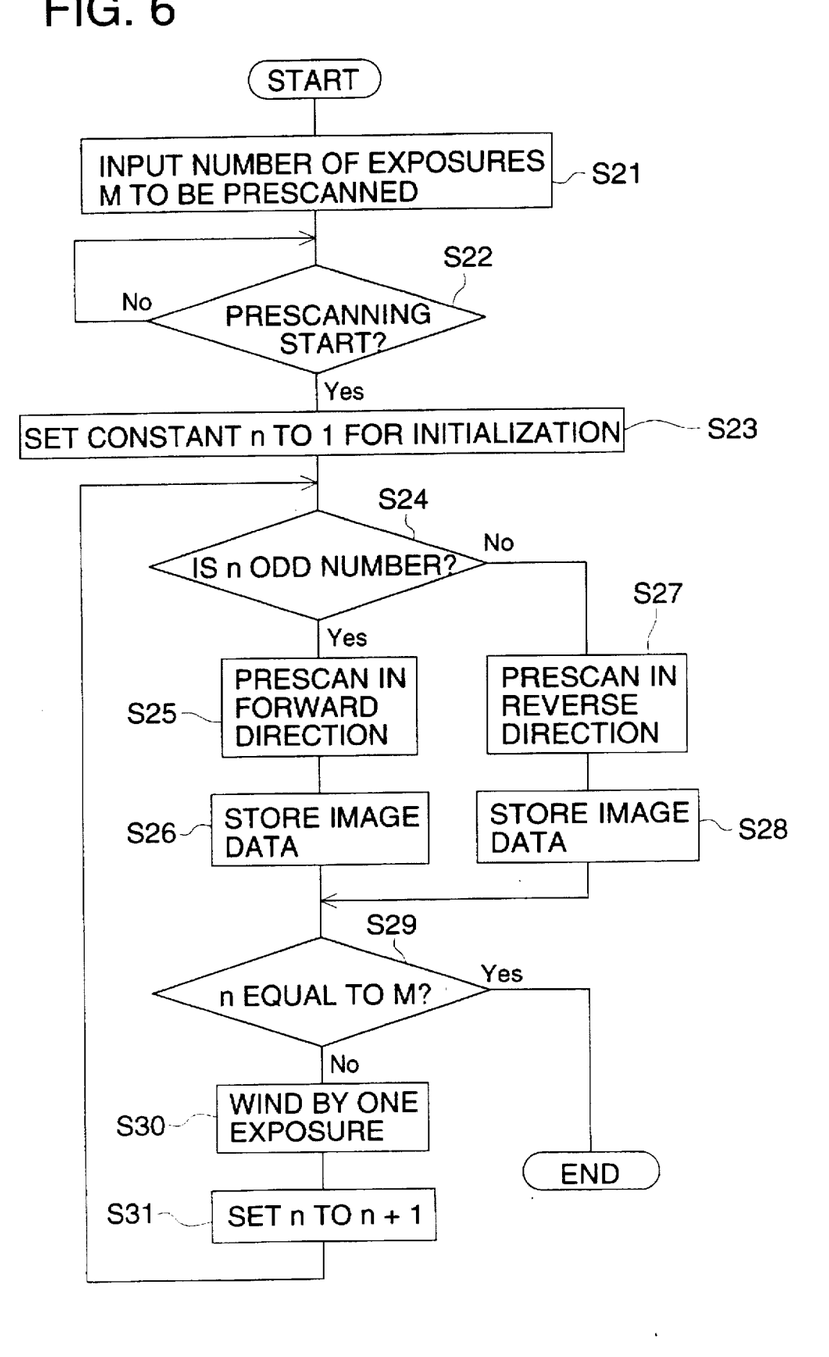
FIG. 6 is a flow chart showing pre-scanning operation of the carrier.

FIG. 6 is a flow chart showing operation of pre-scanning of a carrier. Since IX-240 film (a film for Advanced Photo System) comprises 40 frames in maximum, frame number M which is subjected to pre-scanning is inputted from operation section 22 by the operator (F21). Next, check whether or not pre-scanning is conducted. If scanning start is commanded from operation section 22, the mode becomes to be "pre-scanning mode" (S22).

In this case, first, constant n is set to the initial value, 1 (S23). Next, check whether or not n is an odd number (S24). In the case of the Advanced Photo System, while repeating scanning in the ordinary direction and the reversal direction, prescribed frame number is read with a coarse resolution. If frame number is odd, CPU 1 read frame image information with CCD 37 while moving stage 32 to an ordinary direction (in the arrowed direction in FIG. 2(a)) by activating stepping motor 9 (S25). In this occasion, stage 32 moves. The image data read is sent to personal computer 60 through data communication section 4, and stored in memory 20a inside CPU 20 (S26). Next, carrier 40 is wounded for one frame.

In Step S24, if the relevant frame is even, CPU 1 moves stage 32 toward the reverse direction (from right to left) so that frame image information is read by CCD 37 (S27). The image data read is sent to personal computer 60 through data communication section 4, and housed in memory 20a inside CPU 20 (S28). When reading of one frame of frame image information is finished, CPU 1 checks whether n=M (S29). When n=M, reading of all frames designated has been finished, prescanning is finished. When n≠M, all frames have not been finished yet, CPU 1 activates stage 32 for winding one frame (S30). Next, n is renewed by 1 (S31), followed by returning to Step S4. Then, next reading of the frame will be started. By repeating the above-mentioned operation, continuous prescanning is conducted using an IX-240 film. According to this embodiment, by continuously pre-scanning the film, it is possible to index-displaying frame image information read on a display means.

(3) Frame image display on the CRT

Figure 7:
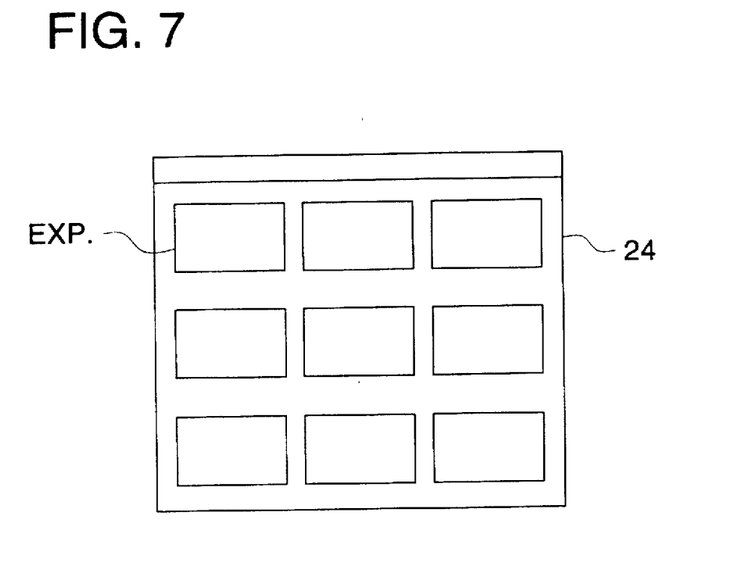
FIG. 7 is a drawing showing an example of frame image displaying onto the CRT.

After reading of frame image data into memory 20a is finished, CPU 20 provides index-display read frame image on the CRT 24. FIG. 7 is a drawing showing display status of the CRT image. As shown in FIG. 7, nine frames are index-displayed per one image. Resolution of CRT 24 is 480 (L) by 640 dots (W). On the contrary, resolution of frame image exposure displayed on an index display is, considering displayed area other than an image and gap in terms of layout, about 110×200 dots, and reading resolution is 170 dpi.

Conventionally, displaying of a frame on the displaying section has been conducted by an operator for each frame. In order to display a desired frame on a display section from plural frames, specifically if the developed film is a negative film, skill was necessary for selecting a relevant frame. Meaning why plural frames are displayed on the display section is as follows. Namely, in the case of a negative film, it is necessary to inform the operator which frame we want to regular-scan by converting aforesaid negative film to a positive image promptly. In addition, it is necessary to inform the operator what kind of image appears on the index display, even though the face may be small. In the case of the IX-240 long roll film, since a negative film is wound on a cartridge, as in the status, images cannot be viewed. Therefore, it is necessary to show the operator what kind of image is recorded promptly. However, if all of 40 frames which is the recording frame number of the IX-240 are displayed, the dimension of one frame become too small to be practical. As a compromise between a desire to view photographed frame image data as soon as possible and a desire to display frame number with necessary and insufficient resolution at one time of operation on the CRT as much as possible, it was settled that 9 frames of images are displayed on a face as described above.

In this way, IX-240 film has 40 frames in maximum, all frames cannot be displayed at one time of display. Accordingly, CPU 20 controls frame number by means of page. The relationship between page and frame is as follows:
First page: 1–9th frame
Second page: 10–18th frame
Third page: 19–27th frame
Fourth page: 28–36th frame
Fifth page: 37–40th page Due to that CPU 20 causes CRT 24 to display message information which selects desired page and that the operator inputs desired page from operation section 22, index image of the desired page is displayed on CRT 24. Incidentally, even if the above-mentioned procedure is not taken, by conducting scrolling operation, index image may be caused to be displayed from the first page successively.

Figure 8A:
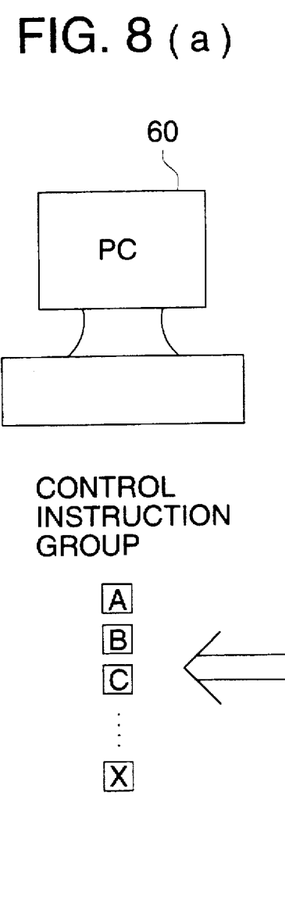
FIGS. 8(a)–8(c) are explanation drawings showing communication of signals of the present invention.
Figure 8B:
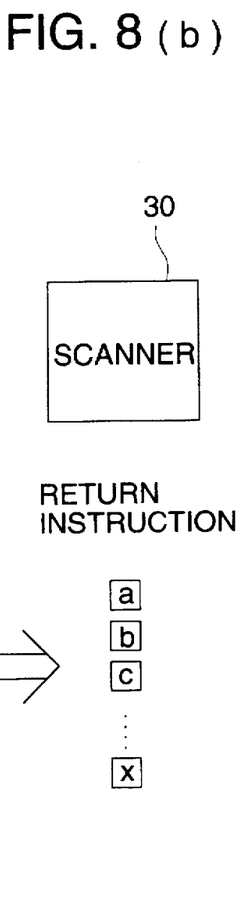
Figure 8C:
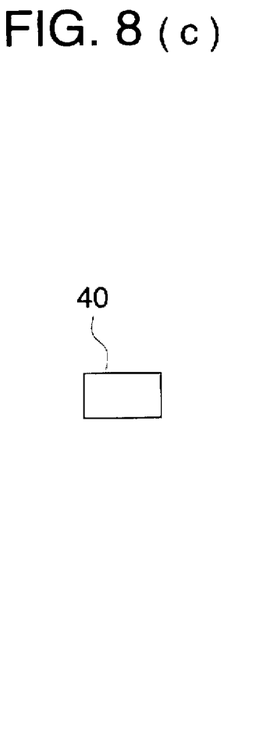

(4) Direct communication between the carrier and the personal computer The above-mentioned embodiment exemplified a case in which the carrier and personal computer (PC) 60 communicates information through scanner 30. However, in the present invention, direct communication between carrier 40 and personal computer 60 is possible. FIG. 8(a)–8(c) show explanation drawings about communication of signals, in which relationship between personal computer 60, scanner 30 and carrier 40 is shown. In ordinary scanning, due to each control instruction (A–X) from personal computer 60, personal computer 60 controls scanner 30. Due to that scanner 30 returns return instructions (a–x) to personal computer 60, personal computer 60 controls scanner 30.

Figure 9:
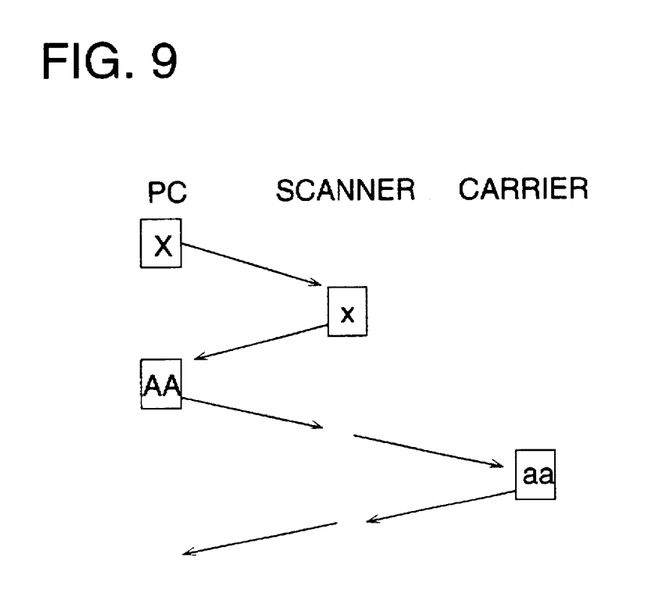
FIG. 9 is an explanation drawing of communication protocol of the present invention.

The above-mentioned control instruction codes and their return instructions can be constituted using 4 bits. For example, control instruction code "A" is "0000". Instruction code B is "0001". Instruction code C is "0010". Similarly, the return instructions can also be constituted using 4 bits. Among the above-mentioned control instructions, "X" represents a carrier control instruction. Due to a flow shown in FIG. 9, personal computer 60 can directly control carrier 40 while scanner 30 does not intervene. As a carrier control instruction code, for example, "1111" is used.

First, the personal computer sends carrier control instruction "X" to the scanner. To this, when the scanner recognizes that this instruction "X" is a control instruction, it returns a return instruction "x" that it does not control thereafter to the personal computer. Due to this, thereafter, direct communication between the personal computer and the carrier becomes possible. For example, if the personal computer sends "AA" which is a control instruction to the carrier, this control instruction is received by the scanner, and aforesaid scanner sends this code to the carrier as it is. Receiving this instruction, the carrier makes actions against this code. After finishing the action, the carrier returns the return instruction "aa" to this action to the scanner as it is. The scanner returns the return instruction "aa" received to the personal computer as it is.

Figure 10A:
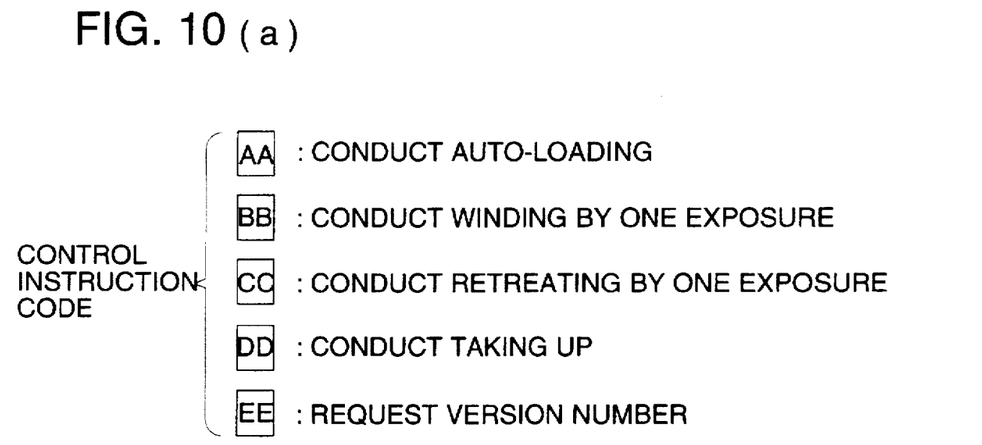
FIGS. 10(a) and 10(b) are drawings showing the carrier control instruction codes and return instructions.
Figure 10B:
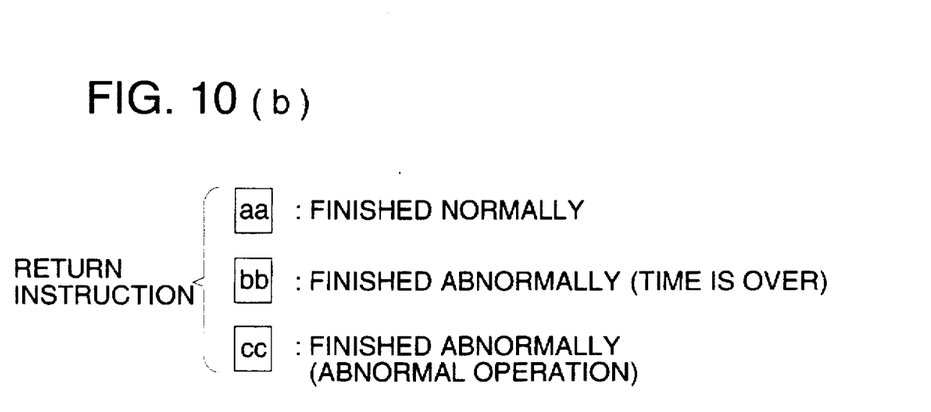

FIGS. 10(a) and 10(b) show carrier's control instruction codes and carrier's return instruction. Both of the above-mentioned carrier control instruction codes and return instructions can be constituted using 4 bits. For example, control code "AA"" represents an auto-loading execution instruction. "BB" represents winding by one exposure. "CC" represents instruction of retreating by one exposure. "DD" represents taking up executing instruction. "EE" represents a version number requesting instruction. To the contrary, with regard to return instruction returned from the carrier, "aa" represents "finished normally" information. "bb" represents "finished abnormally (time is over)" information and "cc" represents finished abnormally (abnormal operation)". In order to restore the instruction system to the initial status, the restore instruction code, for example, "Q" is sent from the personal computer to the scanner. When receiving this instruction code, the scanner returns the return instruction "q" to the personal computer. Hereinafter, communication between personal computer 60 and scanner 30 starts. As described above, owing to the present invention, communication between the personal computer and the film carrier, as control means, becomes possible. Even when specifications are modified, it is not necessary to change the scanner.

(5) Cartridge loading

Figure 11:
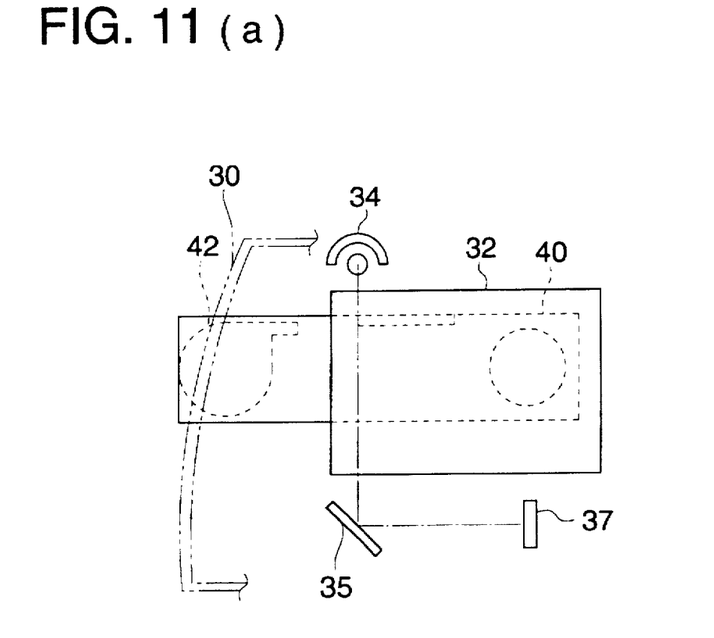
FIGS. 11(a) and 11(b) are explanation drawings of cartridge replacement.

Owing to the present invention, a cartridge can be replaced while loading the carrier on the scanner. FIGS. 11(a) and 11(b) are explanation drawings of cartridge replacement. When an image is read by means of pre-scanning, as shown in FIG. 11(a), cartridge 42 is hidden inside scanner 30. To the contrary, when ejecting, as shown in FIG. 11(b), cartridge 42 is protruded from scanner 30 due to ejecting function. By opening the lid of the cartridge section of carrier 40 under a status as shown in FIG. 11(b), cartridge 42 which has been loaded is removed and a new cartridge can be loaded. As described above, owing to the present invention, it is so convenient to replace cartridges while a film carrier is loaded to the scanner.

In the above-mentioned embodiment, the scanner section and the personal computer section were separated. However, the present invention is not limited thereto. The scanner section and the personal computer section may be integral.

(1) As explained in detail so far, owing to the present invention, in a photographic image processing apparatus which optically reads the above-mentioned image information by means of a reading means while a film on which image information is recorded is loaded on a film carrier and converts to an electrical signal wherein the above-mentioned film carrier is provided with a driving means which drives the film, a driving source which provides driving force to aforesaid driving means, a film driving and controlling means which controls aforesaid driving source and a communication means, by communicating with the film driving and controlling means of the abovementioned film carrier through the above-mentioned communication means and by providing the film carrier with a communication function and a film winding function, loading property of the cartridge can be improved and image information processed by a processing means can effectively be displayed on a displaying means.

(2) In the above-mentioned occasion, the above-mentioned film carrier comprises an aperture for reading an image and a white balance can be taken prior to pre-scanning utilizing the aperture, for reading an image, formed on the film carrier, by the use of outputted data from the reading means for adjusting white balance when irradiated beam from the light source of the above-mentioned reading means passes the above-mentioned aperture for reading the image while the above-mentioned film does not cover the above-mentioned aperture for reading the image. Accordingly, the structure of the film carrier can be downsized and simplified.

(3) In addition, when the film scanner is connected with a personal computer having a displaying means, the film scanner reads a frame of a film retained by the above-mentioned film carrier by means of continuous pre-scanning and displays index image of frame image information read on the displaying means and thereby pre-scans the film continuously. As a result, frame image information read can be index-displaying on the displaying means.

(4) When the film scanner is connected with a personal computer which is provided with a displaying means, an operating means, and an entire control means that displays photographic image information and controls the entire operation, the film scanner forms a system as a photographic image processing apparatus as a whole. The above-mentioned entire control means sends a prescribed control instruction to the above-mentioned scanner and communicate information directly with the above-mentioned film scanner and thereby communicates information between the control means and the film carrier. As a result, the scanner is not necessary to be modified even when specifications are modified.

(5) In addition, the photographic image processing apparatus has an ejection function to drive the film carrier so that a part of the carrier is protruded outside the film scanner and to stop the cartridge inside the above-mentioned film carrier at a position where the cartridge can be replaced. Due to that, it is so convenient that the cartridge can be replaced while the film carrier is loaded to the scanner.

As described above, owing to the present invention, a photographic image processing apparatus can be provided which can effectively process an image when image information is read and displayed on the displaying means, if the type of film is an IX-240 long roll film.

What is claimed is:

1. A film scanner comprising:

(a) a film carrier comprising, an aperture for image reading, a film conveying means for conveying a film on which image information has been recorded to form separated image frames to the aperture one frame by one frame of the film, and a communication means for receiving a control signal to control the film conveying means;

(b) an image reading means for optically reading the recorded image information on the film; and (c) a first outputting means connected with the communication means for outputting the control signal to the film carrier.

2. The film scanner of claim 1 further comprising a moving means for moving the image reading means with respect to the film carrier.

3. The film scanner of claim 1 further comprising a control means for generating the control signal.

4. The film scanner of claim 3, wherein the control means generates a control signal to convey the film by one frame to the film carrier.

5. The film scanner of claim 3, wherein the control means controls the moving means so that the image reading means scans the film and reads image information for one frame of the film.

6. The film scanner of claim 5 further comprising a second outputting means for the image information of said one frame of the film to a host side.

7. The film scanner of claim 1 further comprising a film carrier transporting means for transporting the film carrier.

8. The film scanner of claim 7, wherein the film carrier transporting means transports the film carrier from a predetermined position at which image reading is conducted to an ejecting position.

9. The film scanner of claim 8, wherein at the ejecting position a part of the film carrier is protruded outside the apparatus, and a film cartridge housing the film therein which is loaded inside the film carrier can be replaced.

10. The film scanner of claim 1 further comprising an inputting means for receiving the control signal from a host 11. A film carrier for use in a film scanner, comprising:

(a) an aperture for image reading;

(b) a film conveying means for conveying a film on which image information has been recorded to form separated image frames to the aperture one frame by one frame of the film; and (c) a communication means for receiving a control signal to control the conveying means.

12. The film carrier of claim 11 further comprising a film cartridge loading portion for loading a film cartridge housing the film.

13. The film carrier of claim 12, wherein the film conveying means conveys the film from the film cartridge loaded in the film cartridge loading portion to the aperture for image reading.

14. The film carrier of claim 11 further comprising a driving force transmitting section for transporting the film carrier.

15. The film carrier of claim 14, wherein the driving force transmitting section is a rack provided on a main body of the film carrier.

16. A method for reading an image of a film in an image reading apparatus including: a film scanner loaded with a film carrier having therein an aperture for reading the image, a film conveying means for conveying the film on which image information has been recorded to form separated image frames one frame by one frame to the aperture, and a communicating means for receiving a control signal to control the conveying means; a displaying means; and a control means for controlling the film scanner and the displaying means, the method comprising the steps of:

(a) generating the control signal from a control means;

(b) communicating the control signal to the film carrier through the communication means;

(c) conveying the film by one frame to the aperture for image reading according to the control signal;

(d) optically reading by an image reading means housed in the film scanner the image information recorded on the film conveyed to the aperture for image forming; and (e) displaying the image information on the displaying means.

17. The method of claim 16 further comprising the step of adjusting a white balance by reading an irradiated light emitted from a light source by the image reading means, before the step of conveying the film to the aperture.

18. The method of claim 16, wherein the step of the reading includes reading continuously the film and the step of the displaying includes index-displaying the image information continuously read for a plurality of frames onto the displaying means.

* * * * *